United States Patent [19]

Pokorny

[11] 4,444,975

[45] Apr. 24, 1984

[54] WIRE COATING COMPOSITION FOR RESTORATION OF POLYETHYLENE INSULATION

[75] Inventor: Richard J. Pokorny, St. Paul, Minn.

[73] Assignee: Minnesota Mining and Manufacturing Company, St. Paul, Minn.

[21] Appl. No.: 520,079

[22] Filed: Aug. 3, 1983

[51] Int. Cl.$^3$ .............................................. C08G 18/30
[52] U.S. Cl. ...................................... 528/49; 428/412; 428/424.8; 428/425.8
[58] Field of Search ............... 528/49; 428/412, 424.8, 428/425.8

[56] References Cited

U.S. PATENT DOCUMENTS 4,007,151 2/1977 Ogawa et al. ..................... 260/31.2
4,329,442 5/1982 Pokorny ............................. 528/49

OTHER PUBLICATIONS

Shea, J. W.; "Treatment of Degraded PIC Insulation in Pedestal Closures Associated with Buried Plant," pp. 70–74, Proceedings of the 21st International Wire and Cable Symposium, Cherry Hill, NJ (1971).

*Primary Examiner*—Maurice J. Welsh
*Attorney, Agent, or Firm*—Donald M. Sell; James A. Smith; Lorraine R. Sherman

[57] ABSTRACT

An insulating, restorative composition for wire on which polyethylene insulation has degraded, comprises an admixture of an aliphatic or cycloaliphatic polyisocyanate containing at least two isocyanate groups, a monofunctional alcohol having a molecular weight in the range of 200 to 1,500, and a tri- or tetra-functional aliphatic or cycloaliphatic polyol having a molecular weight in the range of 100 to 900.

20 Claims, No Drawings

WIRE COATING COMPOSITION FOR RESTORATION OF POLYETHYLENE INSULATION

Technical Field

This invention relates to a coating composition for protecting electrical wire, especially communication wire; and for rendering it water-repellent. In another aspect, it relates to a process for waterproofing and protecting electrical wire. In a further aspect, it relates to articles coated with the air-dried insulative coating of the present invention.

Background Art

Polyethylene insulated electrical wire may suffer from degradation of its protective covering. This degradation can result in failure of the electrical properties of the wire or cause it to short out.

To overcome this problem without expensive rewiring, field-applied spray insulation has been developed. An aliphatic polyurethane system useful as a field-applied spray insulation (i.e., B-Insulation Spray, Sprayon Products Div. of Sherwin-Williams Co.) was disclosed by J. W. Shea at the Proceedings of the 21st International Wire and Cable Symposium, Cherry Hill, NJ, "Treatment of Degraded PIC Insulation in Pedestal Closures Associated with Buried Plant," pp. 70–74, 1971.

U.S. Pat. No. 4,007,151 relates to a coating composition comprising a polyisocyanate containing at least three isocyanate groups, a monohydric alcohol which is disclosed as having a molecular weight of 32 to about 150, and a polyhydric alcohol having at least three active hydrogen atoms. This composition has been found to have poor adhesion to polyethylene.

A polyurethane composition prepared from an isocyanate, a polydiol, a tri- or tetra-functional aliphatic polyol, and a monofunctional aliphatic alcohol is disclosed in U.S. Pat. No. 4,329,442 which is useful as a high adhesion plugging and encapsulating compound.

Disclosure of the Invention

Briefly, the present invention provides an insulating, restorative composition for wire on which polyethylene insulation has degraded, the composition comprising an admixture of an aliphatic or cycloaliphatic polyisocyanate containing at least two isocyanate groups, a monofunctional alcohol having a molecular weight in the range of 200 to 1,500, and a tri- or tetra-functional aliphatic or cycloaliphatic polyol having a molecular weight in the range of 100 to 900.

The invention provides a composition having adhesive properties towards insulating polymers such as polyethylene, polycarbonate, polypropylene, and metal, particularly copper, dissolved in a nonflammable mixture of organic solvents. It is compatible with polycarbonate connectors known to stress-crack due to polycarbonate solubility in many solvents. Since insulation restorative compositions are frequently used in enclosed areas such as indoors and in manholes, and on live wires, the liquid composition is non-flammable. It penetrates and is absorbed onto the wire insulation surface, and upon drying, it tightly seals cracks in polyethylene. It re-establishes a thin layer of insulation where the polyethylene has cracked. The dried composition acts as an insulative overcoat on exposed metal wires (e.g., copper or aluminum) or metal connections (e.g., copper, aluminum, silver, gold, brass or solder). The dried coating composition has good clarity, so wire color coding will not be affected.

When the composition of the present invention is dissolved in a suitable solvent a sprayable field-applied insulation is provided. The solvent-containing composition is easily applied, has good electrical characteristics, dries rapidly, resists moisture, is thermally stable at pedestal temperatures, is non-flammable, and has no effect on connectors and other hardware normally used in wire splicing and terminating, and it is particularly useful for polyethylene insulated wires.

As used in this application:

"aliphatic" means a linear or branched, open-chain carbon compound optionally including oxygen and/or nitrogen atoms in the chain; and "cycloaliphatic" means a cyclic, non-aromatic, carbon compound optionally including oxygen and/or nitrogen atoms in the ring or chain.

Detailed Description

The present invention provides an insulation restorative composition for degraded polyethylene insulation on communication wire, said composition comprising the reaction product of an admixture of:

(a) an aliphatic or cycloaliphatic polyisocyanate containing at least two isocyanate groups, (b) 0.2 to 0.6, preferably 0.25 to 0.5, equivalents based on the isocyanate groups, of a monofunctional alcohol having a molecular weight in the range of 200 to 1500, (c) 0.8 to 0.4, preferably 0.75 to 0.5, equivalents based on the isocyanate groups, of a tri- or tetra-functional aliphatic or cycloaliphatic polyol having a molecular weight in the range of 100 to 900, and (d) up to about 5 percent by weight of said admixture of at least one catalyst capable of promoting a reaction between said isocyanate compound and said monofunctional alcohol and said polyol compounds;

wherein said isocyanate compound is present in sufficient quantity to provide an NCO/OH ratio of from about 0.95 to 1.05 in said admixture.

This composition is dissolved at a level of 4 to 12 percent by weight of the total solution, preferably 6 to 9 percent by weight, in a solvent system comprising 88 to 96 percent by weight of the total solution, the solvent system being a mixture of $C_6$ to $C_{11}$ aliphatic or cycloaliphatic hydrocarbons and trichlorotrifluoroethane. To provide a non-flammable solvent mixture, the level of trichlorotrifluoroethane should be from 75 to 95 percent by weight of the solvents and preferably 80 to 90 percent. The aliphatic hydrocarbons comprise 5 to 25 percent, and preferably 10 to 20 percent by weight of the solvent mixture.

Organic isocyanates having utility herein include aliphatic and cycloaliphatic isocyanates having at least two NCO groups per molecule. Exemplary of such isocyanates and dimer acid diisocyanates derived from a $C_{36}$ dibasic acid, trimethylhexamethylene diisocyanate, 4,4'-methylene-bis(cyclohexylisocyanate), isophorone diisocyanate, as well as mixtures of such isocyanates, with a mixture of dimer acid diisocyanate with 4,4'-methylene-bis(cyclohexylisocyanate) being preferred.

To insure sufficient crosslinking in the cured resin, the tri- and tetra-polyol-based component should contain polyols of hydroxyl functionality between about 3 and 4, having a molecular weight in the range of 100 and 900, and more preferably 150 to 600, and having an aliphatic or cycloaliphatic moiety, optionally including O and/or N atoms. Examples of such polyols include polyoxypropylene glycol, polyoxyethylene glycol, polyoxytetramethylene glycol, and small amounts of polycaprolactone glycol. The preferred polyol is Quadrol TM, N,N,N',N'-tetrakis(2-hydroxypropyl)ethylene diamine, available from BASF Wyandotte Corp.

The monofunctional alcohol component of the present invention is a branched or straight chain aliphatic or cycloaliphatic, preferably alkyl, alcohol having up to about 100 carbon atoms, and preferably contains 13 to 30 carbon atoms. This component acts as an internal plasticizer as well as an internal surfactant to promote better adhesion between the cured polyurethane resin and the polyethylene insulation. Examples of such alcohols include tridecyl alcohol, stearyl alcohol, octadecenol, isohexacosanol, and Primarol 1511 TM (a mixture of $C_{24}$ to $C_{28}$ 2-alkyl alcohols available from Henkel Corp.).

The composition of the present invention is prepared by predissolving the catalyst and the mono- and polyfunctional alcohols in a hydrocarbon solvent (as described above) at room temperature or slightly above (approximately 30° C.). The isocyanate is added, then the components are mixed at elevated temperatures, preferably about 100° C., for a time sufficient to totally react the isocyanate (usually 3 hours at 100° C.). The composition is cooled to room temperature. Trichlorotrifluoroethane is then added and the composition is stirred for 5 to 10 min.

In conventional fashion by a pre-reaction mechanism, the isocyanate component can be prereacted with a portion of the polyol component to form an isocyanate-terminated prepolymer, which when subsequently reacted with the remaining alcohol components will produce a urethane resin having the requisite properties.

The isocyanate should be present in a stoichiometric amount, i.e., in sufficient quantity to provide an NCO/OH ratio from about 0.95 to about 1.05.

Also admixed in the composition are compounds which are capable of serving as catalysts for the isocyanate/hydroxyl reaction and are suitable for the particular combination of polyols and isocyanates chosen. Up to about 5 percent by weight of the admixture of at least one catalyst has been found useful in the composition of the invention. Examples of such compounds include tetravalent tin compounds, metal acetyl acetonates, and organo mercury compounds. Preferred is a catalytic amount of an organotin catalyst system comprising the reaction product of a carboxylic acid and a dialkyl tin oxide, i.e., dibutyl tin di(2-ethylhexanoate) (Catalyst T-8 TM, Metal and Thermite Co.).

If it is desirable to improve the flexibility and/or aging characteristics of the composition, a flexibilizing polymer such as polyisobutylene or ethylene copolymerized with vinyl acetate, acrylate esters, methacrylate esters, or alpha-olefins optionally may be added. The flexibilizing polymer is a rubbery, compatible, adherent material that helps provide a thick, flexible coating. Preferably, it is soluble in the solvent system. Preferably, it is an ethylene vinyl acetate copolymer, for example, ethylene vinylacetate copolymer with 33% vinyl acetate (Elvax 150 TM, E. I. Dupont de Nemours Corp.), or ethylene vinylacetate copolymers with 28% vinyl acetate (Elvax 240 TM or Elvax 250 TM, E. I. Dupont de Nemours Corp.), or butyl rubber (Exxon Butyl 165 TM, Exxon Chemical Co.). An amount of flexibilizing polymer up to 5 weight percent, and preferably 1 to 2 weight percent, of the dried composition can be used.

For ease of application, the insulation composition is in solution form, the solvent system, as mentioned above, being a mixture of $C_6$ to $C_{11}$ aliphatic or cycloaliphatic hydrocarbons and trichlorotrifluoroethane. Since polycarbonate connectors are widely used in the communication field, and since polycarbonate is susceptible to stress-cracking and crazing in certain solvents, solvents useful in the present invention must provide solubility to the polyurethane polymer and flexibilizing polymers, but not to polycarbonate. A mixture of $C_6$ to $C_{11}$ aliphatic or cycloaliphatic hydrocarbons such as heptane, hexane, VMP Naptha, and trichlorotrifluoroethane (Freon TF TM, E. I. Dupont de Nemours Corp.) provide the desired solubility for the components of the mixture and not to polycarbonate, as well as providing a suitable drying rate after application.

Antioxidants may be added in an amount sufficient to prevent oxidation of the composition, typically in the range of 0 to 5 weight percent of the dry components, and include phenols, phosphites (for example tris(nonyl phenyl)phosphite), thioesters, and amines (for example phenyl beta naphthalene). Preferred is a hindered phenol, such as tetrakis[methylene 3-(3',5'-di-tert-butyl-4'-hydroxyphenyl)propionate]methane (Irganox 1010 TM, Ciba-Geigy Corp.), thiodiethylene bis-(3,5-di-tert-butyl-4-hydroxy)hydrocinnamate (Irganox 1035 TM, Ciba-Geigy Corp.), or octadecyl-3-(3',5'-di-tert-butyl-4'-hydroxyphenyl)propionate (Irganox 1076 TM, Ciba-Geigy Corp.), a copper ion scavenger and antioxidant such as MD1024 TM (Ciba-Geigy Corp.), or a compound such as distearyl thiodipropionate (Cyanox STDP TM, American Cyanamid Polymer and Chem. Dept.).

The insulating composition of the present invention may be sprayed, dipped, or brushed onto metal, polyethylene, and polycarbonate to a thickness of about 25 to 50 microns. Since it can be field-applied, preferably it dries tack-free at ambient conditions in 10 to 40 minutes. The evaporation rate, desirably, is slow enough so as not to clog the spray head, and fast enough so as to result in a reasonably rapid drying speed for the applied composition.

The wire coating composition is useful to form a smooth coated film on bare wire or polyethylene insulated wire in the field.

Objects and advantages of this invention are further illustrated by the following examples, but the particular materials and amounts thereof recited in these examples, as well as other conditions and details, should not be construed to unduly limit this invention.

EXAMPLE 1

A coating was prepared by mixing 0.1 parts by weight of dibutyl tin di(2-ethylhexanoate) (catalyst T-8, Metal and Thermite Company), 2.4 parts of stearyl alcohol, 9.6 parts of a mixture of $C_{24}$, $C_{26}$ and $C_{28}$ 2-alkyl alcohols (Primarol TM 1511, Henkel Corp.), 3.8 parts of N,N,N',N'-tetrakis(2-hydroxypropyl)ethylene diamine, (Quadrol TM, BASF Wyandotte Corp.), and 72.4 parts of VMP Naptha. This was stirred for 15 minutes to dissolve the solids. Next, 1.6 parts of dimer diisocyanate and 10.1 parts of 4,4'-methylene-bis(cyclohexylisocyanate) (Desmodur TM W, Mobay Chemical Corp.) were added and the mixture was heated at 100°

C. for three hours. It was allowed to cool overnight before testing was begun.

To measure adhesion the samples were dip-coated at a dry thickness of 0.03 mm on low density polyethylene (NPE 130 TM, Northern Petrochemical Company). After drying for one week at room temperature, adhesion was measured per ASTM D-3359-74. 0 means no adhesion and 5 means excellent adhesion. A rating of at least 1 is acceptable and 2 or greater is preferred.

Insulation Resistance was measured by cutting a 1 mm long nick in 5 polyethylene insulated 22 AWG wires. These wires were then coated with 0.03 mm of the coating compositions. The wires were soaked in tap water for 24 hours and the insulation resistance was measured at 300 volts D.C. on a No. 1864 megohmmeter from General Radio while the wires were immersed in water.

The formulation for sample 1/1a (weight percent/equivalent percent) is show in TABLE I below, and the polyethylene adhesion and 24 hour insulation resistance data are shown in TABLE II.

EXAMPLES 2-8

Following the method and evaluation procedure of EXAMPLE 1, coatings of samples 2/2a–8/8a (weight percent/equivalent percent) were prepared and evaluated. The sample formulations are shown in TABLE I and the polyethylene adhesion and 24 hour insulation resistance data for these samples are shown in TABLE II.

TABLE I

Coating Formulations

| Sample No. | 1 | 1a | 2 | 2a | 3 | 3a | 4 | 4a | 5 | 5a | 6 | 6a | 7 | 7a | 8 | 8a | 9 | 9a |
|---|---|---|---|---|---|---|---|---|---|---|---|---|---|---|---|---|---|---|
| catalyst T-8 | 0.1 | | 0.1 | | 0.1 | | 0.1 | | 0.1 | | 0.1 | | 0.1 | | 0.1 | | 0.1 | |
| alcohol | | | | | | | | | | | | | | | | | | |
| butyl alcohol | | | | | | | | | | | | | | | | | 1.2 | 0.23 |
| tridecyl alcohol | | | | | | | | | 4.6 | 0.29 | | | | | | | | |
| octadecenol | | | 6.2 | 0.29 | | | | | | | | | | | | | | |
| stearyl alcohol | 2.4 | 0.11 | | | | | 2.4 | 0.11 | | | 3.9 | 0.13 | 2.3 | 0.08 | 2.3 | 0.10 | | |
| Primarol 1511 | 9.6 | .26 | | | 17.8 | 0.45 | 9.6 | 0.26 | | | 9.9 | 0.19 | 9.0 | 0.20 | 9.3 | .26 | | |
| Quadrol | 3.8 | 0.63 | 4.1 | 0.71 | 3.6 | 0.55 | 3.8 | 0.63 | 4.1 | 0.71 | | | | | | | 3.9 | 0.77 |
| 260 mwt polypropylene oxidetriol[a] | | | | | | | | | | | | | 6.3 | 0.72 | | | | |
| 400 mwt polypropylene oxide tetrol[b] | | | | | | | | | | | 5.7 | 0.68 | | | | | | |
| 600 mwt polypropylene oxide tetrol[c] | | | | | | | | | | | | | | | 7.7 | 0.64 | | |
| solvent | | | | | | | | | | | | | | | | | | |
| VMP Naptha | 72.4 | | 77.2 | | 66.9 | | 71.9 | | 76.2 | | 68.0 | | 67.6 | | 70.1 | | 73.6 | |
| isocyanate | | | | | | | | | | | | | | | | | | |
| 600 mwt aliphatic isocyanate | 1.6 | 0.07 | 5.7 | .24 | | | 1.6 | 0.07 | 9.9 | 0.42 | | | 2.3 | 0.08 | | | 21.1 | 1.0 |
| isophorone diisocyanate (IPDI)[e] | | | 6.7 | .76 | | | | | 5.1 | 0.58 | | | | | | | | |
| Desmodur W | 10.1 | 0.93 | | | 11.6 | 1.00 | 10.1 | 0.93 | | | 12.4 | 1.00 | 12.4 | 0.92 | 10.5 | 1.00 | | |
| flexibilizer | | | | | | | | | | | | | | | | | | |
| ethylene vinyl-acetate copolymer with 28% vinyl acetate[f] | | | | | | | 0.5 | | | | | | | | | | | |

TABLE II

Polyethylene Adhesion and Insulation Resistance/Water Soak Test

| Sample no. | 1 | 2 | 3 | 4 | 5 | 6 | 7 | 8 | 9 | 10[g] |
|---|---|---|---|---|---|---|---|---|---|---|
| Polyethylene adhesion | 3.0 | 2.5 | 4 | 2.5 | 1 | 3.0 | 2.0 | 1.0 | 0 | 0 |
| 24 hr. Insulation Resistance (5 samples) (ohms) | $10^{12}$ | $10^{11}$ | $>10^{14}$ | $10^{12}$ | $10^{13}$ | $10^{12}$ | $10^{13}$ | $>10^{14}$ | $<10^{6}$ | $10^{12}$ |
| | $10^{12}$ | $10^{11}$ | $>10^{14}$ | $10^{11}$ | $10^{13}$ | $10^{12}$ | $>10^{14}$ | $>10^{14}$ | $<10^{6}$ | $10^{12}$ |
| | $10^{12}$ | $10^{11}$ | $10^{11}$ | $10^{8}$ | $10^{13}$ | $10^{12}$ | $10^{12}$ | $10^{12}$ | $<10^{6}$ | $10^{13}$ |
| | $10^{12}$ | $10^{11}$ | $>10^{14}$ | $10^{12}$ | $10^{13}$ | $10^{12}$ | $>10^{14}$ | $>10^{14}$ | $<10^{6}$ | $10^{12}$ |
| | $10^{12}$ | $10^{11}$ | $>10^{14}$ | $10^{12}$ | $10^{14}$ | $10^{12}$ | $10^{11}$ | $>10^{14}$ | $<10^{6}$ | $>10^{14}$ |

[a] LG 650 (Union Carbide Corp.)
[b] PEP 450 (BASF Wyandotte Corp.)
[c] PEP 650 (BASF Wyandotte Corp.)
[d] DDI (Henkel Corp.)
[e] IPDI (Thorson Chemical Co., NJ)
[f] Elvax 240 TM (E. I. Dupont de Nemours Corp.)
[g] Coating of Ex. 3 of U.S. Pat. No. 4,007,151 had the formulation: 1 equiv Desmodur N, 0.5 equiv Cellosolve, 0.5 equiv trimethylol propane, 20 weight percent methyl ethyl ketone The data of TABLE II show that the samples within the invention (i.e., samples 1–8) all had good polyethylene adhesion and high insulation resistance. Sample 9 contained a monofunctional alcohol having a molecular weight of less than 200 and exhibited poor adhesion and insulation resistance properties. Sample 10 also contained a low molecular weight alcohol and it exhibited poor adhesion to polyethylene.

Various modifications and alterations of this invention will become apparent to those skilled in the art without departing from the scope and spirit of this invention, and it should be understood that this invention is not to be unduly limited to the illustrative embodiments set forth herein.

I claim:
1. A polyurethane composition comprising the reaction product of an admixture of:
    (a) an aliphatic or cycloaliphatic polyisocyanate containing at least 2 isocyanate groups,
    (b) 0.2 to 0.6 equivalents, based on the isocyanate groups, of a monofunctional alcohol having a molecular weight in the range of 200 to 1500,
    (c) 0.8 to 0.4 equivalents, based on the isocyanate groups, of a tri- or tetra-functional aliphatic or cycloaliphatic polyol having a molecular weight in the range of 100 to 900, and
    (d) up to about 5 percent by weight of said admixture of at least one catalyst capable of promoting a reaction between said isocyanate compound and said monofunctional alcohol and said polyol compounds;
wherein said isocyanate compound is present in sufficient quantity to provide an NCO/OH ratio of from about 0.95 to 1.05 in said admixture.

2. The composition according to claim 1 wherein said polyisocyanate contains 2 isocyanate groups.

3. The composition according to claim 1 wherein said monofunctional alcohol is present in the range of 0.25 to 0.5 equivalents, based on the isocyanate groups.

4. The composition according to claim 1 wherein said monofunctional alcohol is an alkyl alcohol having 13 to 30 carbon atoms.

5. The composition according to claim 4 wherein said monofunctional alcohol is selected from at least one of the group consisting of stearyl alcohol and a mixture of $C_{24}$ to $C_{28}$ 2-alkyl alcohols.

6. The composition according to claim 1 wherein said tri- or tetra-functional polyol is present in the range of 0.75 to 0.5 equivalents, based on the isocyanate groups.

7. The composition according to claim 1 wherein said tri- or tetra-functional polyol has a weight in the range of 150 to 600.

8. The composition according to claim 6 wherein said polyol is N,N,N',N'-tetrakis(2-hydroxypropyl)ethylene diamine.

9. The composition according to claim 1 further comprising an amount of an antioxidant sufficient to prevent oxidation of said composition.

10. The composition according to claim 1 further comprising up to 5 weight percent of a flexibilizing polymer.

11. A coating solution comprising an admixture of
    (a) 4 to 12 weight percent of the coating solution of the reaction product of an admixture of:
        (1) an aliphatic or cycloaliphatic polyisocyanate containing at least 2 isocyanate groups,
        (2) 0.2 to 0.6 equivalents, based on the isocyanate groups, of a monofunctional alcohol having a molecular weight in the range of 200 to 1500,
        (3) 0.8 to 0.4 equivalents, based on the isocyanate groups, of a tri- or tetra-functional aliphatic or cycloaliphatic polyol having a molecular weight in the range of 100 to 900, and
        (4) up to about 5 percent by weight of said admixture of at least one catalyst capable of promoting a reaction between said isocyanate compound and said monofunctional alcohol and said polyol compounds;
    wherein said isocyanate compound is present in sufficient quantity to provide an NCO/OH ratio of from about 0.95 to 1.05 in said admixture, and
    (b) 88 to 96 weight percent of the coating solution of a solvent system comprising an admixture of $C_6$ to $C_{11}$ aliphatic or cycloaliphatic hydrocarbons and trichlorotrifluoroethane.

12. The coating solution according to claim 11 wherein said trichlorotrifluoroethane comprises 75 to 95 percent by weight of the solvent system.

13. The coating solution according to claim 11 wherein said trichlorotrifluoroethane comprises 80 to 90 weight percent of said solvent system.

14. The coating solution according to claim 11 wherein said aliphatic hydrocarbon in said solvent system is selected from octane, heptane, hexane, and VMP Naptha.

15. An article comprising a substrate having a composition coated on at least one surface thereof comprising the reaction product of an admixture of
    (a) an aliphatic or cycloaliphatic polyisocyanate containing at least 2 isocyanate groups,
    (b) 0.2 to 0.6 equivalents, based on the isocyanate groups, of a monofunctional alcohol having a molecular weight in the range of 200 to 1500,
    (c) 0.8 to 0.4 equivalents, based on the isocyanate groups, of a tri- or tetra-functional aliphatic or cycloaliphatic polyol having a molecular weight in the range of 100 to 900, and
    (d) up to about 5 percent by weight of said admixture of at least one catalyst capable of promoting a reaction between said isocyanate compound and said monofunctional alcohol and said polyol compounds;
wherein said isocyanate compound is present in sufficient quantity to provide an NCO/OH ratio of from about 0.95 to 1.05 in said admixture.

16. The article according to claim 15 wherein said coating composition further comprises an amount of an antioxidant sufficient to prevent oxidation of said composition.

17. The article according to claim 15 wherein said substrate is an insulating polymer selected from polyethylene, polycarbonate, and polypropylene, or metal.

18. The article according to claim 15 prepared by coating said substrate with said composition by means of spraying, dipping, or brushing.

19. An article according to claim 15 wherein said article is an electrical wire.

20. An article according to claim 19 wherein said wire is polyethylene insulated.

* * * * *